United States Patent [19]

Sobotker, Jr.

[11] Patent Number: 5,743,693
[45] Date of Patent: Apr. 28, 1998

[54] DOUBLE-ENDED NAIL DRIVING SYSTEM

[76] Inventor: Edmond P. Sobotker, Jr., 6208 Marquerite Dr., Newark, Calif. 94560

[21] Appl. No.: 788,707

[22] Filed: Jan. 23, 1997

[51] Int. Cl.⁶ .................................................. F16B 15/00
[52] U.S. Cl. ........................... 411/460; 411/923; 411/469
[58] Field of Search .............................. 411/458, 459, 411/460, 923, 469; 30/358

[56] References Cited

U.S. PATENT DOCUMENTS

| 847,888 | 3/1907 | Birdsall | 411/459 |
| 2,570,626 | 10/1951 | Abraham | 411/458 |

FOREIGN PATENT DOCUMENTS

| 1392574 | 2/1965 | France | 411/458 |
| 2287611 | 5/1976 | France | 411/458 |
| 801181 | 12/1950 | Germany | 411/458 |
| 12910 | 5/1910 | United Kingdom | 411/458 |

*Primary Examiner*—Neill R. Wilson

[57] ABSTRACT

A new Double-Ended Nail Driving System for securing two boards together without scarring a surface of the boards by securing a conventional fastener into the surface of the boards. The inventive device includes a double-ended nail having a center flange, an elongated cylinder having an elongated cavity projecting into an end for removably receiving an end of the double-ended nail, and a lower flange attached to the end for engaging the center flange of the double-ended nail. The lower flange engages the center flange thereby allowing the user to tap upon an opposite end with a conventional hammer thereby penetrating the double-ended nail into the board within dulling a sharpened end of the double-ended nail. The present invention further reduces the amount of scarring normally associated with conventional fasteners securing the two boards together.

9 Claims, 3 Drawing Sheets

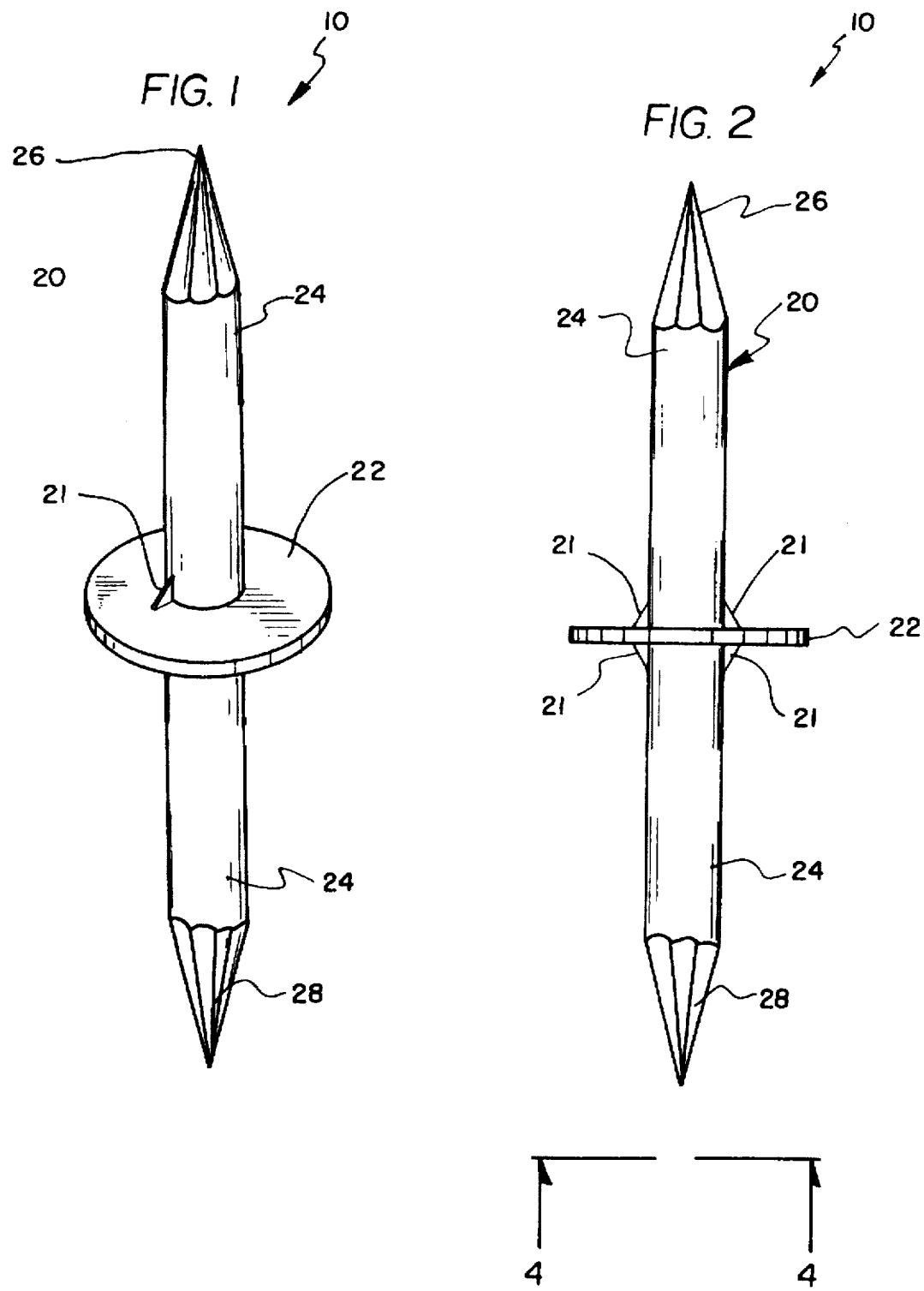

DOUBLE-ENDED NAIL DRIVING SYSTEM

BACKGROUND OF THE INVENTION

1. Field of the Invention

The present invention relates to Nail Devices and more particularly pertains to a new Double-Ended Nail Driving System for securing two boards together without scarring a surface of the boards by securing a conventional fastener into the surface of the boards.

2. Description of the Prior Art

The use of Nail Devices is known in the prior art. More specifically, Nail Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Nail Devices include U.S. Pat. No. 4,779,393; U.S. Pat. No. 4,571,911; U.S. Design Pat. 351,335; U.S. Pat. No. 3,960,460; U.S. Pat. No. 4,223,585 and U.S. Pat. No. 3,897,713.

While these devices fulfill their respective, particular objectives and requirements, the aforementioned patents do not disclose a new Double-Ended Nail Driving System. The inventive device includes a double-ended nail having a center flange, an elongated cylinder having an elongated cavity projecting into an end for removably receiving an end of the double-ended nail, and a lower flange attached to the end for engaging the center flange of the double-ended nail.

In these respects, the Double-Ended Nail Driving System according to the present invention substantially departs from the conventional concepts and designs of the prior art, and in so doing provides an apparatus primarily developed for the purpose of securing two boards together without scarring a surface of the boards by securing a conventional fastener into the surface of the boards.

SUMMARY OF THE INVENTION

In view of the foregoing disadvantages inherent in the known types of Nail Devices now present in the prior art, the present invention provides a new Double-Ended Nail Driving System construction wherein the same can be utilized for securing two boards together without scarring a surface of the boards by securing a conventional fastener into the surface of the boards.

The general purpose of the present invention, which will be described subsequently in greater detail, is to provide a new Double-Ended Nail Driving System apparatus and method which has many of the advantages of the Nail Devices mentioned heretofore and many novel features that result in a new Double-Ended Nail Driving System which is not anticipated, rendered obvious, suggested, or even implied by any of the prior art Nail Devices, either alone or in any combination thereof.

To attain this, the present invention generally comprises a double-ended nail having a center flange, an elongated cylinder having an elongated cavity projecting into an end for removably receiving an end of the double-ended nail, and a lower flange attached to the end for engaging the center flange of the double-ended nail.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Double-Ended Nail Driving System apparatus and method which has many of the advantages of the Nail Devices mentioned heretofore and many novel features that result in a new Double-Ended Nail Driving System which is not anticipated, rendered obvious, suggested, or even implied by any of the prior art Nail Devices, either alone or in any combination thereof.

It is another object of the present invention to provide a new Double-Ended Nail Driving System which may be easily and efficiently manufactured and marketed.

It is a further object of the present invention to provide a new Double-Ended Nail Driving System which is of a durable and reliable construction.

An even further object of the present invention is to provide a new Double-Ended Nail Driving System which is susceptible of a low cost of manufacture with regard to both materials and labor, and which accordingly is then susceptible of low prices of sale to the consuming public, thereby making such Double-Ended Nail Driving System economically available to the buying public.

Still yet another object of the present invention is to provide a new Double-Ended Nail Driving System which provides in the apparatuses and methods of the prior art some of the advantages thereof, while simultaneously overcoming some of the disadvantages normally associated therewith.

Still another object of the present invention is to provide a new Double-Ended Nail Driving System for securing two boards together without scarring a surface of the boards by securing a conventional fastener into the surface of the boards.

Yet another object of the present invention is to provide a new Double-Ended Nail Driving System which includes a double-ended nail having a center flange, an elongated cylinder having an elongated cavity projecting into an end for removably receiving an end of the double-ended nail, and a lower flange attached to the end for engaging the center flange of the double-ended nail.

Still yet another object of the present invention is to provide a new Double-Ended Nail Driving System that provides a procedure for driving a double-ended nail into a board straight and without damage to a sharpened end of the double-ended nail.

Even still another object of the present invention is to provide a new Double-Ended Nail Driving System that provides strong, invisible joint similar to types achieved with the use of dowels and glue.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper perspective view of a new Double-Ended Nail Driving System according to the present invention.

FIG. 2 is a side view thereof.

DESCRIPTION OF THE PREFERRED EMBODIMENT

Figure 3:
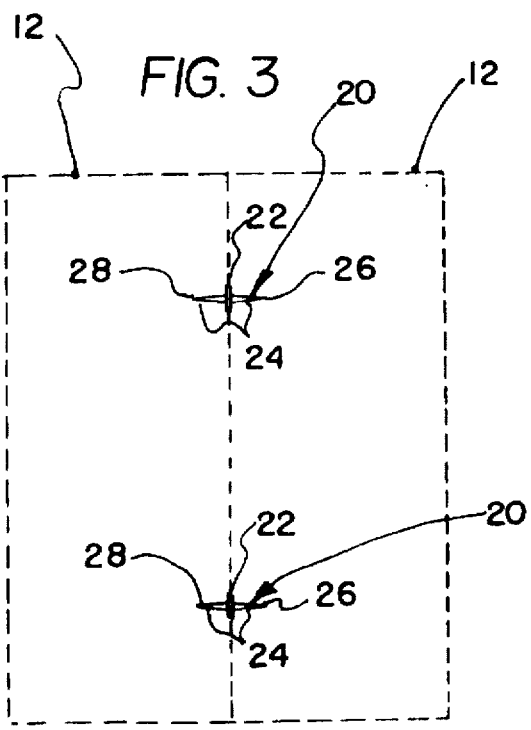
FIG. 3 is a top view of the present invention securing two boards together.
Figure 4:
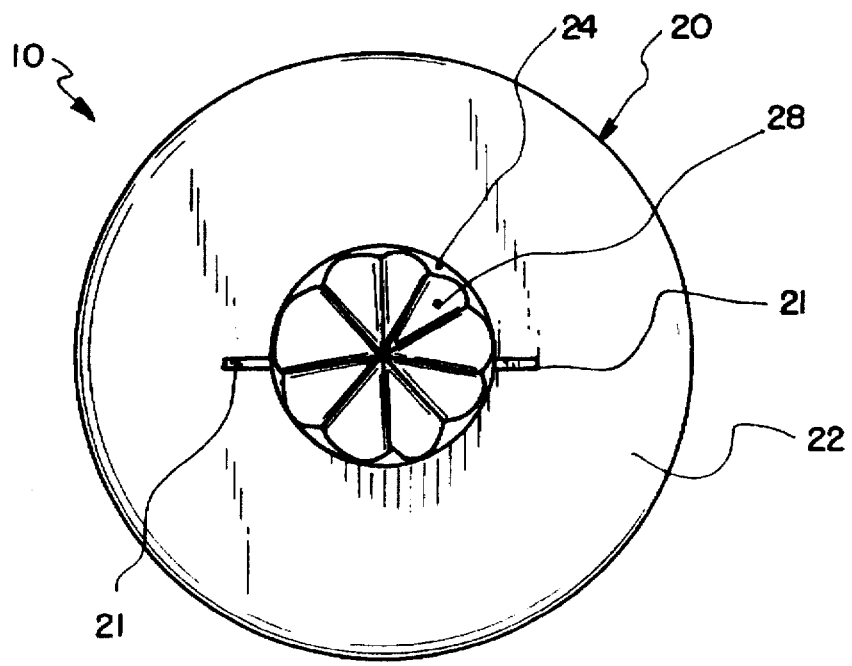
FIG. 4 is a cross sectional view taken along line 4—4 of FIG. 2 of the drawings.

With reference now to the drawings, and in particular to FIGS. 1 through 6 thereof, a new Double-Ended Nail Driving System embodying the principles and concepts of the present invention and generally designated by the reference numeral 10 will be described.

More specifically, it will be noted that the Double-Ended Nail Driving System 10 comprises a double-ended nail 20 and a driving means 30 for removably engaging the double-ended nail 20 for driving an end of the doubled ended nail into a board 12 straight and without dulling an opposite end of the double-ended nail 20.

As shown in FIGS. 1 through 4 of the drawings, the double-ended nail 20 comprises an elongated shaft 24 having a first pointed end 26 and a second pointed end 28. A center flange 22 is secured concentrically to the elongated shaft 24 as best shown in FIGS. 1 and 2 of the drawings. A plurality of support members 21 are preferably secured mesially and angled to the elongated shaft 24 and a lower surface of the center flange 22 for preventing movement of the center flange 22 during driving of the double-ended nail 20 into the wood. The plurality of support members 21 may alternatively be secured to the lower surface of the center flange 22 and an upper surface of the center flange 22 for providing reinforcement from either direction the double-ended nail 20 is driven as best shown in FIG. 2 of the drawings.

Figure 5:
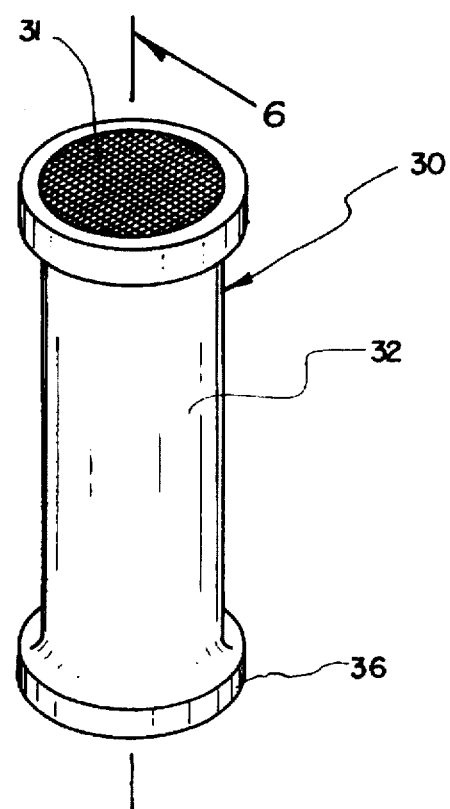
FIG. 5 is an upper perspective view of the driving means.
Figure 6:
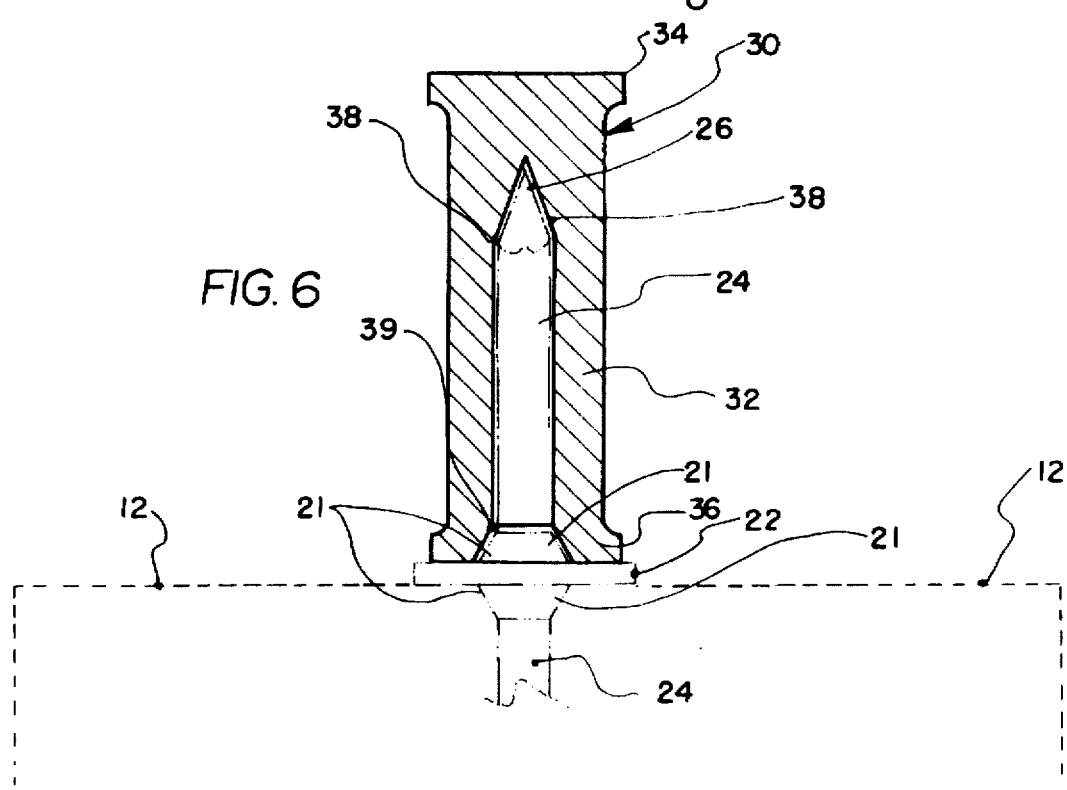
FIG. 6 is a cross sectional view taken along line 6—6 of FIG. 5 disclosing the double-ended nail removably surrounded by the driving means.

As shown in FIGS. 5 and 6 of the drawings, the driving means 30 comprises an elongated cylinder 32 having a first end and a second end. An elongated cavity 38 projects into the second end coaxially within the elongated cylinder 32 as best shown in FIG. 6 of the drawings. The elongated cavity 38 is preferably formed to distally surround the shaft 24 of the double-ended nail 20 as shown in FIG. 6 of the drawings. The second end of the elongated shaft 24 removably preferably engages the center flange 22 for driving the double-ended nail 20 into the board 12 without dulling the first pointed end 26 or the second pointed end 28 of the shaft 24 as shown in FIG. 6 of the drawings. A lower flange 36 is secured to the second end for engaging the center flange 22 as shown in FIGS. 5 and 6 of the drawings.

In an alternative embodiment, a tapered opening 39 projects into the second end of the elongated cylinder 32 coaxially with the elongated cavity 38 for removably receiving the plurality of support members 21 without interference of the lower flange 36 engaging with the center flange 22 of the double-ended nail 20 as best shown in FIG. 6 of the drawings. As shown in FIGS. 5 and 6 of the drawings, an upper flange 34 is secured to the first end of the elongated cylinder 32 for providing an increased surface area for engagement by a conventional hammer. The first end preferably has a reticulated gripping surface 31 for preventing slippage of the conventional hammer during engagement of the conventional hammer with the first end as best shown in FIG. 5 of the drawings.

In use, either the first pointed end 26 or the second pointed end 28 is positioned juxtaposed to a first of two boards 12 to be secured. The driving means 30 is positioned around the pointed end 26 or 28 opposite of the first board 12. The lower flange 36 of the driving means 30 engages the center flange 22. The user then manipulates the conventional hammer to tap the first end of the elongated cylinder 32. The force of the conventional hammer engaging the first end is transferred to the center flange 22 whereby the pointed end 26 or 28 juxtaposed to the first board 12 penetrates the first board 12 without damaging the opposite pointed end 26 or 28. The conventional hammer continuously engages the first end until the center flange 22 becomes juxtaposed to the first board 12 thereby preventing further penetration of the double-ended nail 20. The driving means 30 is thereafter removed from the doubled-ended nail 20. A second board 12 of the two boards is positioned juxtaposed to the pointed end 26 or 28 opposite of the pointed end 26 or 28 driven into the first board 12. The user thereafter taps the second board 12 onto the pointed end 26 or 28 until the second board 12 becomes juxtaposed to the first board 12. The two boards 12 are thus attached without any scarring to their facial surfaces.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A double ended nail driving system comprising:

a double-ended nail having an elongated shaft, said shaft having a first pointed end and a second pointed end, said nail further having a center flange secured concentrically to said elongated shaft;

a driving means for removably engaging said double-ended nail for driving an end of said doubled ended nail into a board straight and without dulling an opposite end of said double-ended nail;

said driving means having an elongated cylinder having a first end and a second end;

said driving means further having an elongated cavity projecting into said second end coaxially within said elongated cylinder, wherein said elongated cavity is formed to distally surround said shaft of said double-ended nail and wherein said second end removably engages said center flange for driving said double-ended nail into said board without dulling said first pointed end or said second pointed end of said shaft; and said driving means further including a lower flange secured to said second end for engaging said center flange.

2. The double ended nail driving system of claim 1, including a plurality of support members secured mesially and angled to said elongated shaft and said center flange for preventing movement of said center flange during driving of said double-ended nail into said wood.

3. The double ended nail driving system of claim 2, including a tapered opening projecting into said second end coaxially with said elongated cavity for removably receiving said plurality of support members without interference of said lower flange engaging with said center flange of said double-ended nail.

4. The double ended nail driving system of claim 3, including an upper flange secured to said first end of said elongated cylinder for providing an increased surface area for engagement by a conventional hammer.

5. The double ended nail driving system of claim 4, wherein said first end includes a reticulated gripping surface for preventing slippage of said conventional hammer during engagement of said conventional hammer with said first end.

6. A double ended nail driving system comprising:

a driving means for removably engaging and driving an end of a doubled ended nail into a board straight and without dulling an opposite end of said double ended nail;

said driving means having an elongated cylinder having a first end and a second end;

said driving means further having an elongated cavity projecting into said second end coaxially within said elongated cylinder, wherein said elongated cavity is formed to distally surround a shaft of said double-ended nail and wherein said second end removably engages a center flange of said double-ended nail for driving said double-ended nail into said board without dulling a first pointed end or a second pointed end of a shaft of said double-ended nail; and said driving means further including a lower flange secured to said second end for engaging said center flange of said double-ended nail.

7. The double ended nail driving system of claim 6, including a tapered opening projecting into said second end coaxially with said elongated cavity for removably receiving a plurality of support members secured onto said double-ended nail without interference of said lower flange engaging with said center flange of said double-ended nail.

8. The double ended nail driving system of claim 7, including an upper flange secured to said first end of said elongated cylinder for providing an increased surface area for engagement by a conventional hammer.

9. The double ended nail driving system of claim 8, wherein said first end includes a reticulated gripping surface for preventing slippage of said conventional hammer during engagement of said conventional hammer with said first end.

* * * * *